United States Patent [19]

Doetsch et al.

[11] 4,397,833
[45] Aug. 9, 1983

[54] PROCESS FOR THE CONTINUOUS PRODUCTION OF ALKALI METAL SUPEROXIDES

[75] Inventors: Werner Doetsch; Paul-Wilhelm Fuchs, both of Bad Hoenningen, Fed. Rep. of Germany

[73] Assignee: Peroxid-Chemie GmbH, Hoellriegelskreuth, Fed. Rep. of Germany

[21] Appl. No.: 346,957

[22] Filed: Feb. 8, 1982

[30] Foreign Application Priority Data

Feb. 16, 1981 [DE] Fed. Rep. of Germany ....... 3105584

[51] Int. Cl.³ .............................................. B01J 2/24
[52] U.S. Cl. .................................. 423/581; 422/129; 422/240
[58] Field of Search ......................... 423/582, 583, 581

[56] References Cited

U.S. PATENT DOCUMENTS

| | | | |
|---|---|---|---|
| 3,120,997 | 2/1964 | Petrocelli | 423/581 |
| 3,212,850 | 10/1965 | Klebba | 423/582 |
| 3,809,746 | 5/1974 | Takahashi | 423/581 |
| 3,816,604 | 6/1974 | Malafosse | 423/581 |
| 3,907,506 | 9/1975 | Malafosse | 423/581 |

FOREIGN PATENT DOCUMENTS

| | | | |
|---|---|---|---|
| 1063582 | 8/1959 | Fed. Rep. of Germany | 423/582 |
| 2313116 | 9/1973 | Fed. Rep. of Germany | 423/581 |
| 1150752 | 4/1969 | United Kingdom | 423/581 |
| 2048842 | 12/1980 | United Kingdom | 423/583 |

*Primary Examiner*—O. R. Vertiz
*Assistant Examiner*—Wayne A. Langel
*Attorney, Agent, or Firm*—Schwartz, Jeffery, Schwaab, Mack, Blumenthal & Koch

[57] ABSTRACT

The process of continuously producing an alkali metal superoxide comprises the reaction of an aerosol of hydrogen peroxide and an alkali metal hydroxide in an inert gas. The reacting aerosol is of the solid/gaseous type or of the liquid/gaseous type. The reaction is preferably carried out in an apparatus comprising a reaction chamber, inlet ducts for the reactants and a dry gas, and an outlet duct conducting the reacted aerosol to means for separating the resulting solid alkali metal superoxide from the gaseous phase.

19 Claims, 2 Drawing Figures

PROCESS FOR THE CONTINUOUS PRODUCTION OF ALKALI METAL SUPEROXIDES

BACKGROUND OF THE INVENTION

(1) FIELD OF THE INVENTION

The present invention relates to a simple and highly advantageous process of continuously producing alkali metal superoxides and more particularly of potassium superoxide as well as to an apparatus which is especially suitable for carrying out said process.

(2) THE PRIOR ART

Potassium superoxide of the Formula $KO_2$ is extensively used as oxygen-supplying agent, for instance, for the automatic regeneration of air to be inhaled.

Said compound is produced in accordance with known processes by reacting hydrogen peroxide with potassium hydroxide. Technically used processes of this type comprise a first reaction step in which a hydrogen peroxide solution is reacted with an aqueous potassium hydroxide solution under carefully controlled reaction temperature conditions.

Thus, for instance, in accordance with German application No. 23 13 116 which has been laid open for public inspection, there are added the two reactants in properly adjusted molecular proportions to a previously prepared mixture of the reactants whereby the reaction solution is kept at a reaction temperature below 10° C. Subsequently the reaction solution which contains as initial reaction product an addition compound composed of potassium peroxide and hydrogen peroxide (potassium peroxide-di-hydrogen peroxidate) is subjected in a second reaction step to rapid dehydration in a small spot-like zone in order to produce potassium superoxide.

According to Japan Kokai No. 71 70,896 (Chem. Abstr. 81, 172 403x) there is produced a mixture with a hydrogen peroxide: potassium hydroxide ratio of 1.75 from a 50% aqueous potassium hydroxide solution and a 60% aqueous hydrogen peroxide solution at a temperature between 15° C. and 35° C. Said mixture is subsequently subjected to spray drying to yield potassium superoxide.

Both processes have substantial disadvantages. Thus considerable expenditures are involved on carrying out the first mentioned process. Both processes require first the preparation of an aqueous reaction mixture in which losses due to decomposition must be kept within tolerable limits by careful temperature control. Due to the strongly exothermic reaction taking place it is necessary to provide cooling devices of correspondingly large dimensions. This has a disadvantageous effect upon the economy of the two processes.

SUMMARY OF THE INVENTION

It is one object of the present invention to provide a process of producing alkali metal superoxides in continuous operation and more particularly potassium superoxide of the Formula $KO_2$, which process does not have the disadvantages of the heretofore known and used processes and which can be carried out economically.

Another object of the present invention is to provide an apparatus for carrying out said process in continuous operation.

Other objects of the present invention and advantageous features thereof will become apparent as the description proceeds.

In principle the process according to the present invention comprises carrying out the reaction between hydrogen peroxide and an alkali metal hydroxide, especially potassium hydroxide by causing the reactants to react continuously with each other in the form of aerosols.

The term "alkali metal hydroxide" in accordance with the present invention indicates the hydroxides of lithium, sodium, potassium, rubidium, and cesium. In this process potassium hydroxide is of special interest for commercially carrying out the present invention.

By the term "aerosol" there are understood in accordance with the definition given by ROEMPP in his "Chemielexikon" 1966, page 83, "small solid or liquid particles which are distributed or suspended in gases". In general all the known processes for producing aerosols can be used for carrying out the present invention.

According to a preferred embodiment of the present invention the reactants are reacted with each other in aerosol form in the presence of a dry gas. Any desired inert gas which preferably is freed of carbon dioxide can be used as aerosol gas. Nitrogen and/or air and preferably air, are the preferred gases for carrying out the process on a commercial scale. By the term "dry gas" there is understood a gas which is capable of absorbing water in gaseous or vapor form which has entered the reaction chamber or has been formed therein.

Furthermore, it is of advantage to introduce the gas into the reaction chamber in two or more separate streams. At least one of these separate gas streams is heated before it enters the reaction chamber.

Although it is possible to mix the reactants with each other before converting them into aerosol form, the preferred procedure, however, is to convert the reactants separately from each other into aerosol form. Thus, for instance, the reactants can be introduced into the reaction chamber at opposite parts thereof and can be converted therein into aerosol form. An especially preferred procedure consists in introducing the reactants separately into the reaction chamber but thorough a single nozzle, i.e. through a multi-jet nozzle and to convert them into aerosol form. When proceeding in this manner careful and thorough mixing of the aerosols of both reactants is achieved and a substantially quantitative reaction is assured.

The reactants are reacted with each other in a substantially stoichiometric molar proportion according to the following empirical reaction equation:

$$3H_2O_2 + 2KOH \rightarrow 2KO_2 + 4H_2O.$$

Thus the molar ratio of hydrogen peroxide to alkali metal hydroxide is within the range of 1.3:1.0 and 2.0:1.0 and preferably within the range of 1.5:1.0 and 1.7:1.0.

It is known that the reaction between hydrogen peroxide and potassium hydroxide to yield potassium superoxide proceeds in two partial reaction steps which together correspond to the above given empirical formula. As a first intermediate product which is also isolated when proceeding according to the known processes, there is formed an addition product of potassium peroxide and hydrogen peroxide, i.e. potassium peroxide-di-hydrogen peroxidate of the Formula $K_2O_2.2$-

$H_2O_2$ in accordance with the following reaction equation:

$$3H_2O_2 + 2KOH \rightarrow K_2O_2 \cdot 2H_2O_2 + 2H_2O.$$

Said addition product decomposes on account of a dismutation reaction at increased temperature to yield potassium superoxide according to the following equation:

$$K_2O_2 \cdot 2H_2O_2 \rightarrow 2KO_2 + 2H_2O.$$

When proceeding according to the present invention, the reaction of the reactants is effected at least at a temperature which corresponds to the dismutation temperature of the addition product. More particularly the reaction is carried out at a temperature of at least 130° C. and more advantageously at a temperature between 200° C. and 220° C.

The energy which is required for adjusting the reaction mixture to the aforesaid temperature, is at least partly supplied by the exothermic reaction enthalpy. Any eventually required additional amount of energy is made available, as already mentioned hereinabove, by heating the dry gas which is introduced into the reaction chamber according to a preferred embodiment of the present invention. It is, of course, understood by a person skilled in this art that the parameters throughput speed, i.e. the speed with which the reactants are passed through the reaction chamber, gas entrance temperature, and reaction enthalpy must be adjusted with respect to each other in order to achieve optimum results.

The alkali metal hydroxide used for the reaction according to the present invention can be employed in the form of a finely pulverized solid material. In this case the resulting aerosol represents a disperse system of the solid/gaseous type. However, preferred is an aerosol of the liquid/gaseous type. The aqueous solution of the alkali metal hydroxide as used for the preparation of such a liquid/gaseous type aerosol contains preferably at least 45%, by weight, of the hydroxide and more particularly between 55%, by weight, and 60%, by weight, thereof.

The hydrogen peroxide used as one of the reactants in the reaction according to the present invention, may contain, if desired, the conventional agents for stabilizing active oxygen. Preferably it is employed as a solution containing at least 50%, by weight, of hydrogen peroxide and more particularly as an aqueous solution containing 70%, by weight, to 85%, by weight, of hydrogen peroxide.

As stated hereinabove, the process according to the present invention is preferably carried out in an especially suitable apparatus which comprises a reaction chamber provided with separate feeding inlet ducts for the hydrogen peroxide, the alkali metal hydroxide, and the dry gas and an outlet duct which is connected with means adapted to separate the gaseous phase of the reacted aerosol from the solid alkali metal superoxide formed.

Those parts of the apparatus which are attacked by corrosion when used in continuous operation, are preferably constructed of non-metallic material, more particularly of alkali-resistant glass.

When proceeding according to the present invention there are achieved a number of substantial advantages over the known processes. Thus the novel process is more economical because, for instance, the heat of reaction does not need to be dissipated by means of expensive cooling devices but is advantageously made use of within the system. Due thereto considerable savings in energy are the result of the omission of the cooling step and the cooling device as well as of the savings in energy required for drying. Furthermore the process according to the present invention which is carried out in continuous operation, permits operation with a high output speed.

In addition thereto the process produces a qualitatively satisfactory product in a high yield.

BRIEF DESCRIPTION OF THE DRAWINGS

The attached drawings illustrate a preferred embodiment of the apparatus used for carrying out the present invention without, however, being limited thereto. In said drawings FIG. 1 is a diagrammatic cross-sectional view of a preferred apparatus for carrying out the present invention, said apparatus comprising a reaction chamber with separate inlet ducts for the reactants and with an outlet duct leading to the means adapted for separating the reaction mixture into the reaction product, i.e. the solid alkali metal superoxide, and the aerosol-forming gas, while

DESCRIPTION OF THE PREFERRED EMBODIMENTS

Figure 1:
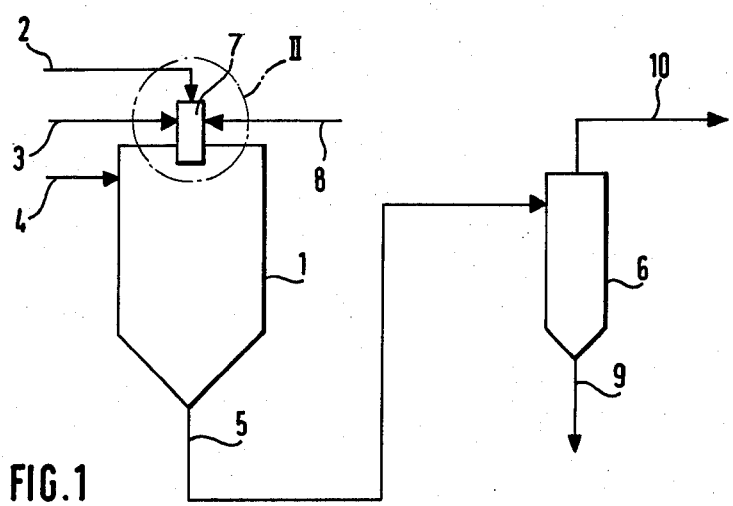

The apparatus illustrated in FIG. 1 of the drawings represents an especially useful embodiment of the present invention. It comprises a reaction chamber 1 which is provided with separate inlet ducts, namely duct 2 for hydrogen peroxide, duct 3 for the alkali metal hydroxide, and duct 4 for the dry gas, and also with an outlet duct 5. Said outlet duct 5 leads to the means 6 adapted to separate the solid phase of the reaction mixture from the gaseous phase. The resulting alkali metal superoxide is withdrawn from the separating means 6 through outlet 9, while the gas is returned to the reaction chamber through outlet 10, if necessary, after drying it.

Figure 2:
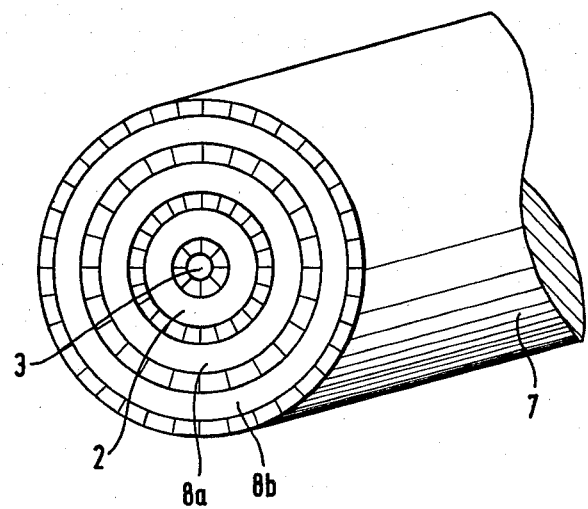
FIG. 2 illustrates partly, in top-view, a multi-material supplying nozzle.

In a special embodiment of the apparatus according to the present invention the inlet duct 2 for hydrogen peroxide and the inlet duct 3 for the alkali metal hydroxide terminate into a multi-material supply nozzle 7. Said nozzle 7 is advantageously provided with one or more additional inlet ducts 8 for a dry gas, as shown in FIG. 2. Said FIG. 2 illustrates, in top view, an especially advantageous embodiment of that part of such a nozzle through which the reactants and the dry gas are introduced into the reaction chamber 1. As is evident from said FIG. 2, the inlet duct 2 for the hydrogen peroxide, duct 3 for the alkali metal hydroxide, and ducts 8a and 8b for the dry gas are arranged co-axially to each other.

The following example serves to illustrate the present invention without, however, being limited thereto.

EXAMPLE

The reaction of the reactants is successfully carried out in an apparatus which is diagrammatically illustrated in FIG. 1. 285.5 g./hr. of hydrogen peroxide (85%, by weight, which is stabilized with 15 g./l. of magnesium sulfate $MgSO_4 \cdot 6H_2O$), 428 g./hr. of an aqueous 55%, by weight, potassium hydroxide solution, and additionally dry nitrogen under a pressure of 2 bar are introduced into the reaction chamber 1 of 75 l. capacity through multi-material supply nozzle 7, illustrated in FIG. 2. Said nozzle 7 is provided with four concentrically arranged inlet ducts, namely inlet duct 2 for hydrogen peroxide, inlet duct 3 for the potassium hydroxide solution, and inlet ducts 8*a* and 8*b* for the dry nitrogen. In addition thereto 100 cu.m./hr. of dry air which has been freed of carbon dioxide are introduced into the reaction chamber 1 through inlet duct 4. Said air has been heated to a temperature of 250° C. The temperature of the solid/gaseous reaction system is 210° C. at the entrance opening into the outlet duct 5. The reaction chamber 1 is connected via outlet duct 5 with a cyclone 6 in which and by means of which the solid reaction product is separated from the gaseous phase. The gaseous phase is removed through duct 10 and the resulting potassium superoxide through withdrawal outlet 9. The pulverulent product contains 85% of potassium superoxide $KO_2$. The finely divided state of the potassium superoxide permits, if desired, subsequently processing of the superoxide, directly without further mechanical treatment, to tablets, pellets, or the like shaped materials.

Of course, many changes and variations in the alkali metal hydroxide used as the one reactant, in the concentration of the aqueous solutions of the reactions, in the gases used for producing the aerosols, in the speed of throughput of the reactants through the reaction apparatus, in the reaction temperature, in the manner in which the solid reaction product is separated from the gaseous aerosol, in the manner in which the aerosol is introduced into the reaction chamber, in the reaction apparatus used for continuously carring out the process according to the present invention, and the like, may be made by those skilled in the art in accordance with the principles set forth herein and in the claims annexed hereto. Main principles to form aerosols are disclosed in Ullmann "Encyclopedia of technical chemistry" [4], 2, pages 254–8 which is hereby incorporated by reference.

What is claimed is:

1. A process for preparing an alkali metal superoxide, which comprises the steps of continuously introducing into a reaction zone an alkali metal hydroxide, hydrogen peroxide and an inert gas; forming in said reaction zone an aerosol comprising the alkali metal hydroxide and hydrogen peroxide finely dispersed in the inert gas; and reacting the alkali metal hydroxide and hydrogen peroxide in said aerosol within said reaction zone at a temperature at least equal to the dismutation temperature of the addition product of the alkali metal peroxide with hydrogen peroxide.

2. A process according to claim 1, wherein the alkali metal hydroxide comprises potassium hydroxide and the resulting reaction product comprises potassium superoxide.

3. A process according to claim 1 or 2, wherein the reaction is carried out in the presence of a substantially dry inert gas.

4. A process according to claim 3, wherein the dry inert gas is substantially free of carbon dioxide.

5. A process according to claim 3, further comprising the steps of supplying the dry inert gas to the reaction zone in at least two partial streams, and heating at least one of said partial streams before it enters the reaction zone.

6. The process as defined in claim 1, wherein said aerosol is formed by introducing a hydrogen peroxide containing aerosol and an alkali metal hydroxide containing aerosol into the reaction zone.

7. A process according to claim 1, wherein the hydrogen peroxide and alkali metal hydroxide are reacted with each other in a molar proportion between about 1.3:1 and about 2:1.

8. A process according to claim 7, wherein the molar proportion is between about 1.5:1 and 1.7:1.

9. A process according to claim 1, wherein the reaction is carried out at a temperature of at least about 130° C.

10. A process according to claim 9, wherein the reaction is carried out at a temperature between about 200° C. and about 220° C.

11. A process according to claim 1, wherein an aqueous solution of the alkali metal hydroxide is converted into aerosol.

12. A process according to claim 11, wherein the concentration of the alkali metal hydroxide in said aqueous solution amounts to at least about 45% by weight.

13. A process according to claim 12, wherein the concentration of the alkali metal hydroxide in said aqueous solution amounts to between about 55% by weight and about 60% by weight.

14. A process according to claim 1, wherein a hydrogen peroxide solution of a concentration of at least 50% by weight is converted into aerosol.

15. A process according to claim 14, wherein an aqueous solution of hydrogen peroxide of a concentration between about 70% by weight and about 85% by weight is converted into aerosol.

16. A process according to claim 4, wherein the dry inert gas comprises nitrogen or air which has been freed of carbon dioxide.

17. A process according to claim 1, wherein the alkali metal hydroxide and the hydrogen peroxide are introduced into the reaction zone through separate passageways in a single nozzle having multiple passageways.

18. A process according to claim 1, further comprising the step of separating the reaction product from the inert gas subsequent to said reaction step.

19. A process according to claim 18, wherein said separating step comprises passing the reaction mixture through a cyclone.

* * * * *